J. S. & T. B. ATTERBURY.

Improvement in Glass Dishes.

No. 132,558. Patented Oct. 29, 1872.

UNITED STATES PATENT OFFICE.

JAMES S. ATTERBURY AND THOMAS B. ATTERBURY, OF PITTSBURG, PA.

IMPROVEMENT IN GLASS DISHES.

Specification forming part of Letters Patent No. 132,558, dated October 29, 1872.

*To all whom it may concern:*

Be it known that we, JAMES S. ATTERBURY and THOMAS B. ATTERBURY, of Pittsburg, in the county of Allegheny and State of Pennsylvania, have invented a new article of manufacture—to wit, a Glass Dish with a Handle; and we do hereby declare that the following is a full, clear, and exact description thereof, reference being had to the accompanying drawing making part of this specification, in which—

Figure 1:
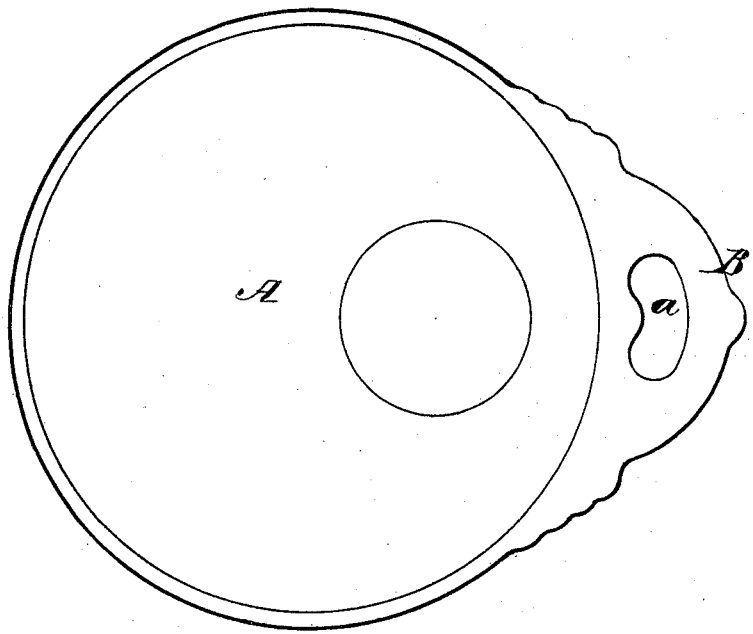
Figure 2:
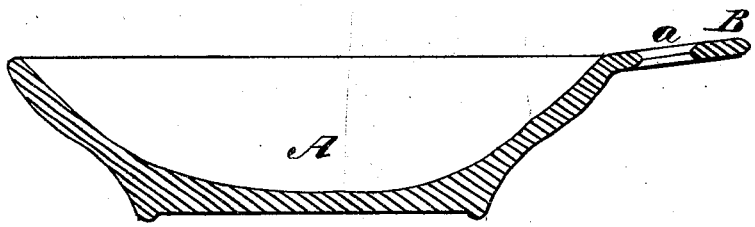

Figure 1 is a top view of a dish with a handle. Fig. 2 is a diametrical section through the dish.

Similar letters of reference indicate corresponding parts in both figures.

The object of our invention is to improve dishes which are made of glass-ware by forming handles on their rims, which not only afford great convenience in handling the dishes, but also beautify them.

The following is a description of my new article of manufacture.

In the accompanying drawing, A represents a glass dish. B represents the handle thereof and *a* an opening through the handle. The dish may be made circular or oblong, deep or very shallow. It may represent in its design a shell or any other appropriate design. It may be used as a saucer, pickle-dish, nappy, or for any other desired purpose. The handle B allows the dish to be firmly grasped between the thumb and finger without getting the fingers soiled by the contents of the dish.

We do not claim, broadly, a plate or pan made with a handle as our invention; but What we do claim is—

The new article of manufacture herein described—to wit, a flaring concave pressed-glass dish with a handle, B, which forms a homogeneous part of the dish, extending out flush with the upper surface of its rim, and of a thickness corresponding very nearly to that of the body of the dish, all as shown and set forth.

JAMES S. ATTERBURY.
THOS. B. ATTERBURY.

Witnesses:
DAVID JENKINS,
JOHN DUNN.